(12) United States Patent
Yamaguchi (10) Patent No.: US 12,479,086 B2
(45) Date of Patent: Nov. 25, 2025

(54) LINEAR MOTION MECHANISM AND SCARA ROBOT

(71) Applicant: FANUC CORPORATION, Yamanashi (JP)

(72) Inventor: Youhei Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/730,541

(22) PCT Filed: Feb. 18, 2022

(86) PCT No.: PCT/JP2022/006563
§ 371 (c)(1),
(2) Date: Jul. 19, 2024

(87) PCT Pub. No.: WO2023/157215
PCT Pub. Date: Aug. 24, 2023

(65) Prior Publication Data
US 2025/0083304 A1 Mar. 13, 2025

(51) Int. Cl.
*B25J 9/04* (2006.01)
*F16H 25/16* (2006.01)
*F16H 25/20* (2006.01)

(52) U.S. Cl.
CPC ............ *B25J 9/044* (2013.01); *F16H 25/16* (2013.01); *F16H 25/20* (2013.01); *F16H 2025/2031* (2013.01); *F16H 2025/2081* (2013.01)

(58) Field of Classification Search
CPC ...... B25J 9/043; B25J 9/044; F16H 2025/204
See application file for complete search history.

(56) References Cited

U.S. PATENT DOCUMENTS

| 10,081,100 B2 * | 9/2018 | Hahakura | B25J 9/044 |
| 2020/0338762 A1 * | 10/2020 | Watanabe | B25J 9/101 |

FOREIGN PATENT DOCUMENTS

| JP | H01169168 A | 7/1989 |
| JP | 2015080837 A | 4/2015 |
| JP | 2018130805 A | 8/2018 |
| JP | 2020163516 A | 10/2020 |
| WO | 2019109273 A1 | 6/2019 |

OTHER PUBLICATIONS

International Search Report dated Apr. 26, 2022, for International Patent Application No. PCT/JP2022/006563.

* cited by examiner

*Primary Examiner* — Gregory Robert Weber
(74) *Attorney, Agent, or Firm* — KARCESKI IP LAW, PLLC (57) ABSTRACT

A linear motion mechanism includes: a shaft extending along a prescribed axis; a structural member provided with a cavity through which the shaft extends; and a spline nut and a ball screw nut that support the shaft so as to be rotatable about the axis and so as to be movable in a direction of the axis, respectively, with respect to the structural member. The spline nut and the ball screw nut are detachably attached to the structural member from both sides sandwiching the structural member via attachment flanges provided thereon. At least one of the spline nut and the ball screw nut is fixed to, inside the cavity, a power transmission member having an outer diameter larger than an outer diameter of one of the attachment flanges provided thereon and is attached to the structural member via an adapter having a larger outer diameter than the power transmission member.

8 Claims, 7 Drawing Sheets

LINEAR MOTION MECHANISM AND SCARA ROBOT

CROSS-REFERENCE TO RELATED APPLICATION(S)

This is a National Stage Entry into the United States Patent and Trademark Office from International Patent Application No. PCT/JP2022/006563, filed on Feb. 18, 2022, the entire content of which is incorporated herein by reference.

FIELD OF THE INVENTION

The present disclosure relates to a linear motion mechanism and a SCARA robot.

BACKGROUND OF THE INVENTION

In a horizontal articulated robot, a linear motion mechanism that includes a working shaft penetrating through a distal end portion of an arm along an axis extending in a vertical direction, a ball screw nut for moving the working shaft in the axial direction, and a spline nut for rotating the working shaft about the axis has been disclosed (for example, see Japanese Unexamined Patent Application, Publication No. 2015-080837).

The ball screw nut and the spline nut are detachably attached from the outside to positions where they close a first hole and a third hole, respectively, which are provided in an upper surface and a lower surface of the distal end portion of the arm and through which the working shaft passes, and are connected to a driven pulley accommodated inside the arm.

SUMMARY OF INVENTION

One aspect of the present disclosure is a linear motion mechanism including: a shaft extending along a predetermined axis; a structural member provided with a cavity through which the shaft extends; and a spline nut and a ball screw nut that support the shaft so as to be rotatable about the axis and so as to be movable in a direction of the axis, respectively, with respect to the structural member. The spline nut and the ball screw nut are detachably attached to the structural member from both sides sandwiching the structural member via attachment flanges provided thereon. At least one of the spline nut and the ball screw nut is fixed to, inside the cavity, a power transmission member having an outer diameter larger than an outer diameter of one of the attachment flanges provided thereon and is attached to the structural member via an adapter having a larger outer diameter than the power transmission member.

DESCRIPTION OF EMBODIMENT(S) OF THE INVENTION

A linear motion mechanism 1 and a SCARA robot 100 according to an embodiment of the present disclosure will be described below with reference to the drawings.

Figure 1:
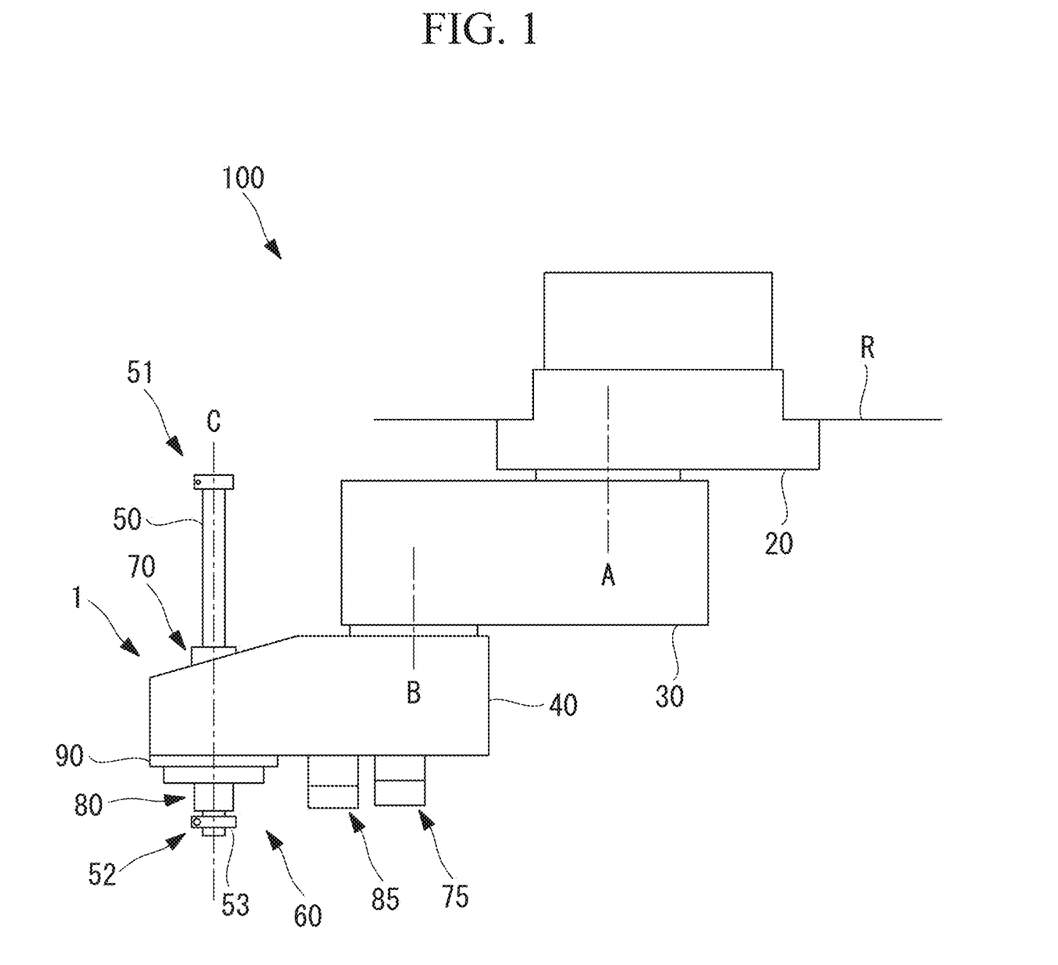
FIG. 1 is a side view showing the overall configuration of a SCARA robot according to an embodiment of the present disclosure.

The linear motion mechanism 1 according to this embodiment is provided in, for example, a ceiling-suspended SCARA robot 100 that is installed in such a manner that it is suspended from a ceiling R, as illustrated in FIG. 1.

The SCARA robot 100 includes a base 20, a first arm 30 supported by the base 20, and a second arm (structural member) 40 supported by the first arm 30.

The first arm 30 is supported by the base 20 so as to be rotatable about a J1 axis A extending in the vertical direction.

The second arm 40 is supported by the first arm 30 so as to be rotatable about a J2 axis (first axis) B parallel to the J1 axis A.

Figure 2:
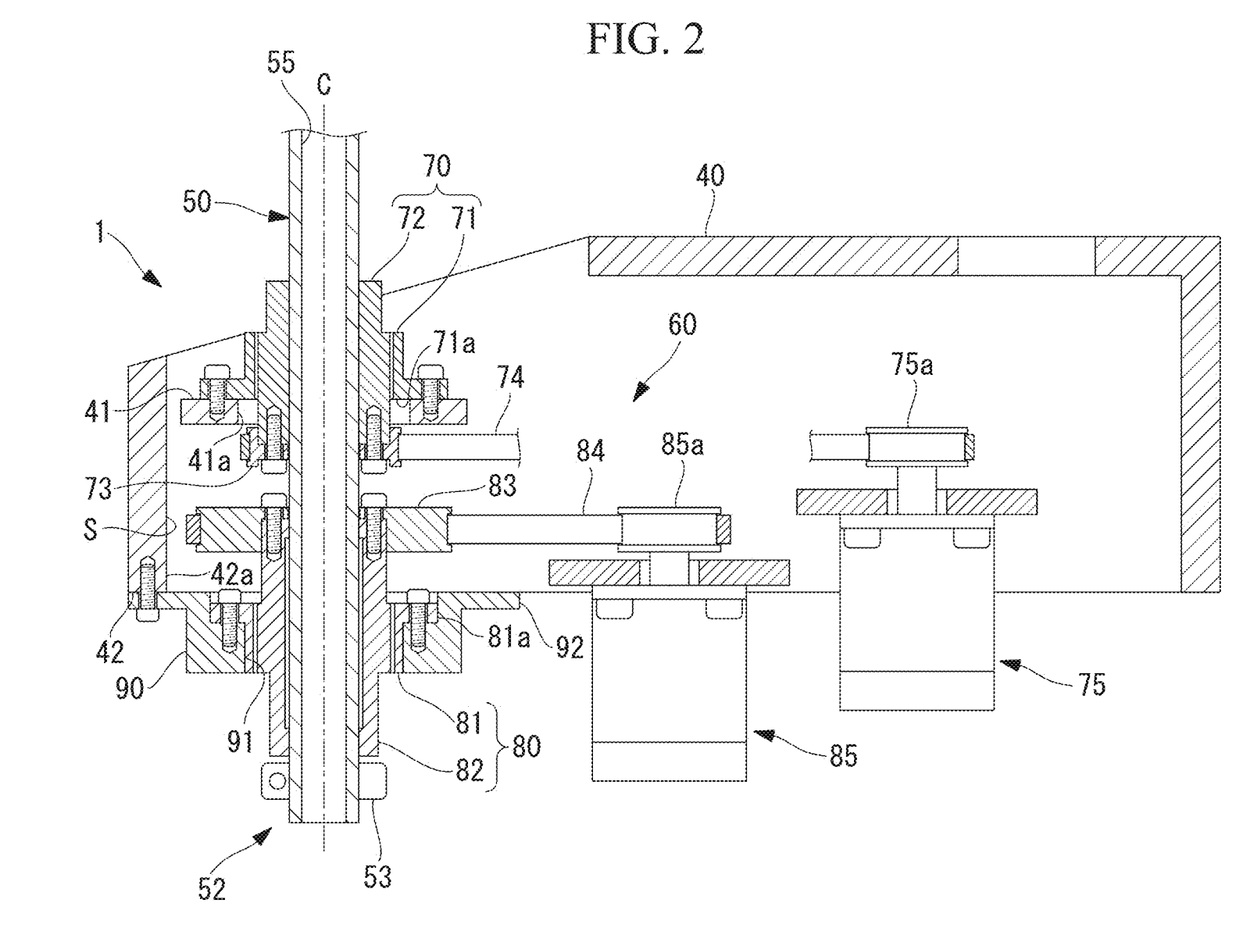
FIG. 2 is a partial vertical cross-section showing a second arm and a part of a linear motion mechanism of the SCARA robot in FIG. 1.

As shown in FIG. 2, the second arm 40 has a hollow structure having a cavity S therein, and is provided with openings 41a and 42a, which communicate between the cavity S and the outside, in an upper surface (first surface) 41 and a lower surface (second surface) 42, respectively.

Figure 3:
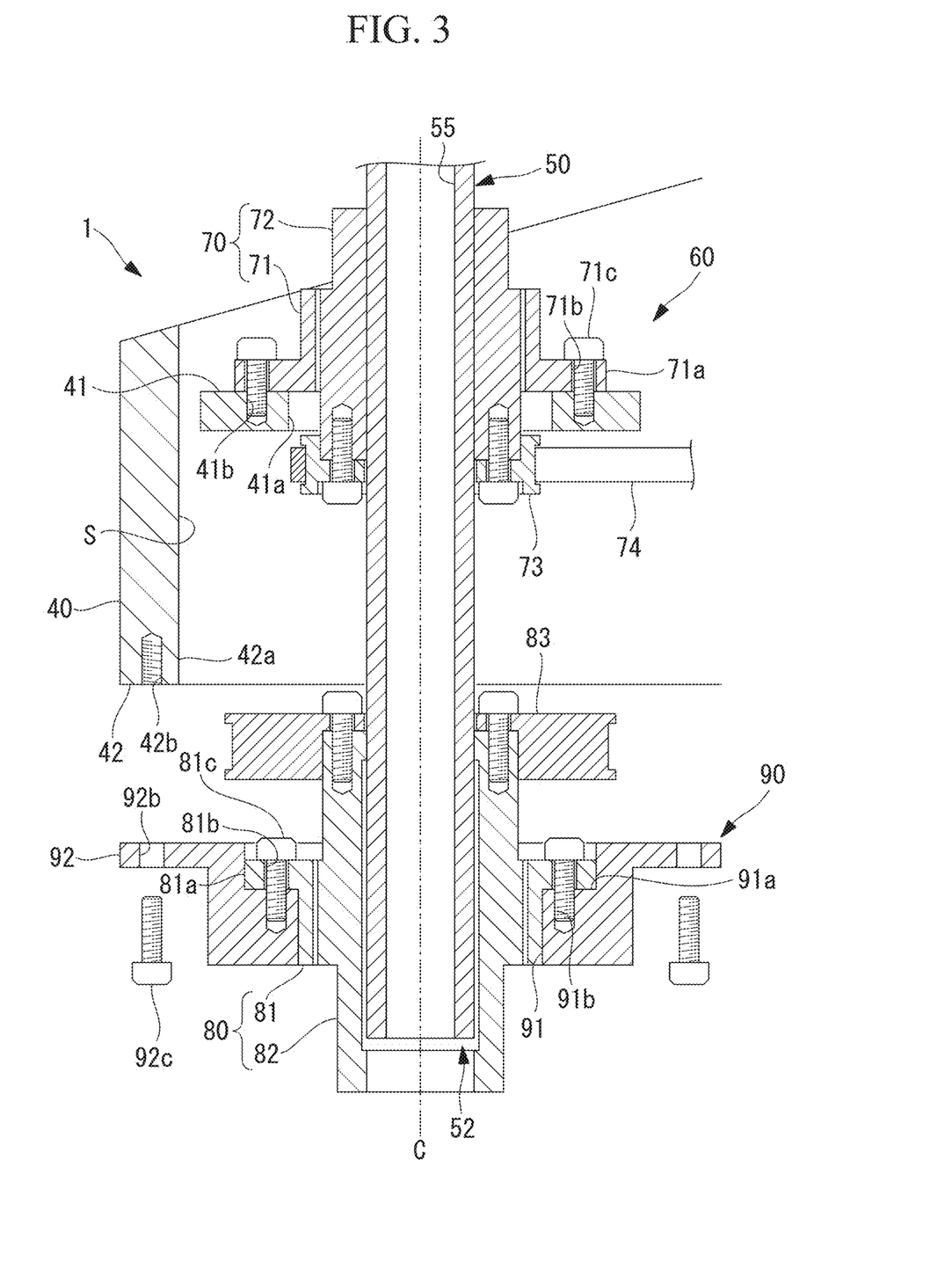
FIG. 3 is a partial vertical cross-section of the linear motion mechanism shown in FIG. 2 with a ball spline nut removed.

As shown in FIG. 3, a plurality of screw holes 41a extending in the vertical direction are provided in the peripheral portion of the opening 41b in the upper surface 41, and a plurality of screw holes 42b extending in the vertical direction are provided in the peripheral portion of the opening 42a in the lower surface 42.

As shown in FIGS. 1 to 3, the linear motion mechanism 1 includes a shaft 50 that penetrates through the distal end portion of the second arm 40 along a J3 axis (axis, second axis) C extending in the vertical direction, and a drive mechanism 60 for driving the shaft 50.

The shaft 50 is, for example, a ball screw spline shaft with a hollow bore 55 extending therethrough along the longitudinal axis.

As shown in FIG. 2, an upper end 51 of the shaft 50 protrudes vertically upward from the opening 41a in the second arm 40. A lower end 52 of the shaft 50 protrudes vertically downward from the opening 42a in the second arm 40. An attachment part 53 to which a tool (not shown), such as a hand, is attached is attached to the lower end 52.

The drive mechanism 60 includes a ball screw nut 70 and a ball spline nut (spline nut) 80 detachably attached to the second arm 40 at positions where they close the opening 41a and the opening 42a, respectively. The drive mechanism 60 includes a servo motor (ball screw nut motor) 75 for supplying a rotational force to the ball screw nut 70, and a servo motor (spline nut motor) 85 for supplying a rotational force to the ball spline nut 80. The drive mechanism 60 further includes pulleys (power transmission members) 73 and 83 and belts 74 and 84 for transmitting the rotational force of the servo motors 75 and 85 to the ball screw nut 70 and the ball spline nut 80, respectively.

As shown in FIG. 3, the ball screw nut 70 includes a fixed part 71, and a movable part 72 supported by a bearing (not shown) so as to be rotatable about the J3 axis C with respect to the fixed part 71.

The fixed part 71 is provided with an attachment flange 71a protruding radially outward from the outer circumferential surface thereof over the entire circumference. The attachment flange 71a is provided with a plurality of through-holes 71b penetrating in the thickness direction. The ball screw nut 70 is fixed to the upper surface 41 of the second arm 40 by fastening the bolts 71c passing through the through-holes 71b to the screw holes 41b in the upper surface 41 while bringing the attachment flange 71a into close contact with the upper surface 41 of the second arm 40.

The inner circumferential surface of the movable part 72 is meshed with the outer circumferential surface of the shaft 50 with a plurality of balls (not shown) therebetween. A part of the movable part 72 is accommodated in the cavity S, and the pulley 73 is attached to the part.

As shown in FIG. 2, the belt 74 is stretched between the pulley 73 and the drive pulley 75a attached to the motor shaft of the servomotor 75. When the rotational force of the servo motor 75 is transmitted to the pulley 73 via the belt 74, the movable part 72 rotates about the J3 axis C with respect to the fixed part 71, thus moving the shaft 50 in the direction of the J3 axis C.

The ball spline nut 80 includes a fixed part 81 and a movable part 82 supported by a bearing (not shown) so as to be rotatable about the J3 axis C with respect to the fixed part 81.

The fixed part 81 includes an attachment flange 81a protruding radially outward from the outer circumferential surface thereof over the entire circumference. The attachment flange 81a is provided with a plurality of through-holes 81b penetrating in the thickness direction. By fixing the attachment flange 81a to an adapter 90 (described below) with bolts 81c passing through the through-holes 81b, the ball spline nut 80 is detachably attached to the lower surface 42 of the second arm 40 via the adapter 90.

The inner circumferential surface of the movable part 82 is meshed with the outer circumferential surface of the shaft 50 with a plurality of balls (not shown) therebetween. As shown in FIG. 2, a part of the movable part 82 is accommodated in the cavity S, and the pulley 83 is attached to the part. A belt 84 is stretched between the pulley 83 and a drive pulley 85a attached to the motor shaft of the servomotor 85. The pulley 83 has an outer diameter sufficiently larger than that of the drive pulley 85a. When the rotational force of the servo motor 85 is transmitted to the pulley 83 via the belt 84, the movable part 82 rotates about the J3 axis C with respect to the fixed part 81, rotating the shaft 50 about the J3 axis C.

As shown in FIGS. 2 and 3, the adapter 90 is an annular member having an inner hole 91 into which the fixed part 81 of the ball spline nut 80 is inserted, and includes an attachment flange 92 having an outer diameter larger than the outer diameter of the pulley 83.

The inner hole 91 has a step portion 91a, and the step portion 91a has screw holes 91b at positions corresponding to the plurality of through-holes 81b in the fixed part 81 inserted into the inner hole 91. In a state in which the fixed part 81 is inserted into the inner hole 91, the bolts 81c passing through the through-holes 81b are fastened to the screw holes 91b. Thus, the adapter 90 is fixed to the ball spline nut 80.

The attachment flange 92 has a plurality of through-holes 92b penetrating in the thickness direction. The adapter 90 is detachably attached to the lower surface 42 of the second arm 40 from vertically below by fastening bolts 92c passing through the through-holes 92b to the screw holes 42b in the second arm 40. That is, the adapter 90 is a relay member for attaching the ball spline nut 80 to the second arm 40.

The operation of the linear motion mechanism 1 and the SCARA robot 100 configured as above will be described below.

According to the SCARA robot 100 of this embodiment, the shaft 50 can be two-dimensionally positioned at a desired position, owing to the rotation of the first arm 30 about the J1 axis A with respect to the base 20 and the rotation of the second arm 40 about the J2 axis B with respect to the first arm 30.

By actuating the servo motor 75, the movable part 72 of the ball screw nut 70 can be rotated about the J3 axis C, and the shaft 50 can be linearly moved in the J3 axis C direction with respect to the second arm 40. Furthermore, by actuating the servo motor 85, the movable part 82 of the ball spline nut 80 can be rotated about the J3 axis C, and the shaft 50 can be rotated about the J3 axis C with respect to the second arm 40.

Thus, the shaft 50 positioned at a desired horizontal position can be rotated and moved up and down, whereby the vertical position and the angle around the J3 axis C of the tool attached to the attachment part 53 at the lower end 52 of the shaft 50 can be adjusted.

In this case, the rotation generated by the servo motor 85 is transmitted to the movable part 82 of the ball spline nut 80 via the pulley 83, which has an outer diameter larger than the outer diameter of the drive pulley 85a. Thus, the speed of rotation from the servo motor 85 can be reduced. That is, it is possible to reduce the speed of rotation applied to the shaft 50 and to rotate the shaft 50 with a large torque, without using a reducer. In addition, the reduction ratio of the rotation applied to the shaft 50 can be easily changed simply by changing the outer diameter of the pulley 83.

Thus, compared with a case where a reducer is employed, the structure can be simplified, the manufacturing cost can be reduced, and an increase in weight and size of the linear motion mechanism 1 can be suppressed.

Next, a maintenance method for the linear motion mechanism 1 of the SCARA robot 100 according to this embodiment will be described below.

In the linear motion mechanism 1 according to this embodiment, for example, when maintenance of the ball spline nut 80 is performed, first, bolts fixing the servo motor 85 are loosened from below the second arm 40, and the belt 84 stretched between the pulley 83 and the drive pulley 85a is removed. The attachment part 53 is removed from the lower end 52 of the shaft 50.

In this state, as shown in FIG. 3, the bolts 92c fixing the adapter 90 to the lower surface 42 of the second arm 40 are removed, and the adapter 90 is moved vertically downward along the J3 axis C. By doing so, the ball spline nut 80 fixed to the adapter 90 and the pulley 83 fixed to the movable part 82 of the ball spline nut 80 can be integrally removed from the second arm 40 together with the adapter 90. In this case, the pulley 83 disposed in the cavity S is taken out of the cavity S to the outside through the opening 42a opened by removing the adapter 90 from the lower surface 42.

Thereafter, the pulley 83 and the adapter 90 are removed from the taken out ball spline nut 80, and the ball spline nut 80 is replaced with a new ball spline nut 80. After replacement, the pulley 83 and the adapter 90 are attached to the new ball spline nut 80 through a procedure reverse to the above procedure, and the adapter 90 is attached to the lower surface 42 of the second arm 40 to return to the original state. This way, the maintenance operation of the ball spline nut 80 is completed.

According to this embodiment, the opening 42a in the lower surface 42 can be opened widely by removing the adapter 90, via which the ball spline nut 80 is attached to the second arm 40, from the lower surface 42 of the second arm 40. Hence, although the pulley 83 having a larger outer diameter than the attachment flange 81a is attached to the movable part 82 to reduce the rotational speed of the servomotor 85, the ball spline nut 80 can be removed downward from the second arm 40 without removing the pulley 83.

When the ball spline nut 80 is removed, the adapter 90 is moved vertically downward, that is, in a direction away from the ball screw nut 70 attached to the upper surface 41 of the second arm 40, from the lower surface 42 of the second arm 40. Hence, the ball screw nut 70 does not serve as an obstacle on the movement path of the adapter 90. That is, only the ball spline nut 80 can be removed from the second arm 40 while the ball screw nut 70 is kept attached to the second arm 40.

As described above, according to this embodiment, there are advantages in that it is possible to easily reduce the speed of rotation input to the ball spline nut 80 and to reduce the man-hour when maintaining the ball spline nut 80.

In this embodiment, the pulley 73 fixed to the ball screw nut 70 has a smaller outer diameter than the attachment flange 71a, via which the ball screw nut 70 is fixed to the upper surface 41 of the second arm 40. Thus, the ball screw nut 70 is directly attached on the upper surface 41. That is, the ball screw nut 70 is attached to the second arm 40 without using the adapter 90.

Therefore, the ball screw nut 70 can be easily removed upward from the second arm 40 together with the shaft 50, independently of the ball spline nut 80. Thus, there is an advantage in that the ball spline nut 80 does not have to be removed when the ball screw nut 70 is maintained.

When a pulley 73 having a large outer diameter is attached to the ball screw nut 70, the ball screw nut 70 may be attached to the second arm 40 via an adapter 90, in the same manner as the ball spline nut 80.

In that case, the inner diameter of the opening 41a in the upper surface 41 of the second arm 40 may be set within a range that does not exceed the outer diameter of the adapter 90 and that allows the pulley 73 having a large outer diameter to be attached to the ball screw nut 70 to pass therethrough. This makes it possible to easily reduce the speed of rotation input to the ball screw nut 70 and to easily remove the ball screw nut 70.

In the above-described embodiment, one of the ball screw nut 70 and the ball spline nut 80 is attached to the second arm 40 via the adapter 90. Alternatively, both of the ball screw nut 70 and the ball spline nut 80 may be attached to the second arm 40 via the adapters 90.

Figure 4:
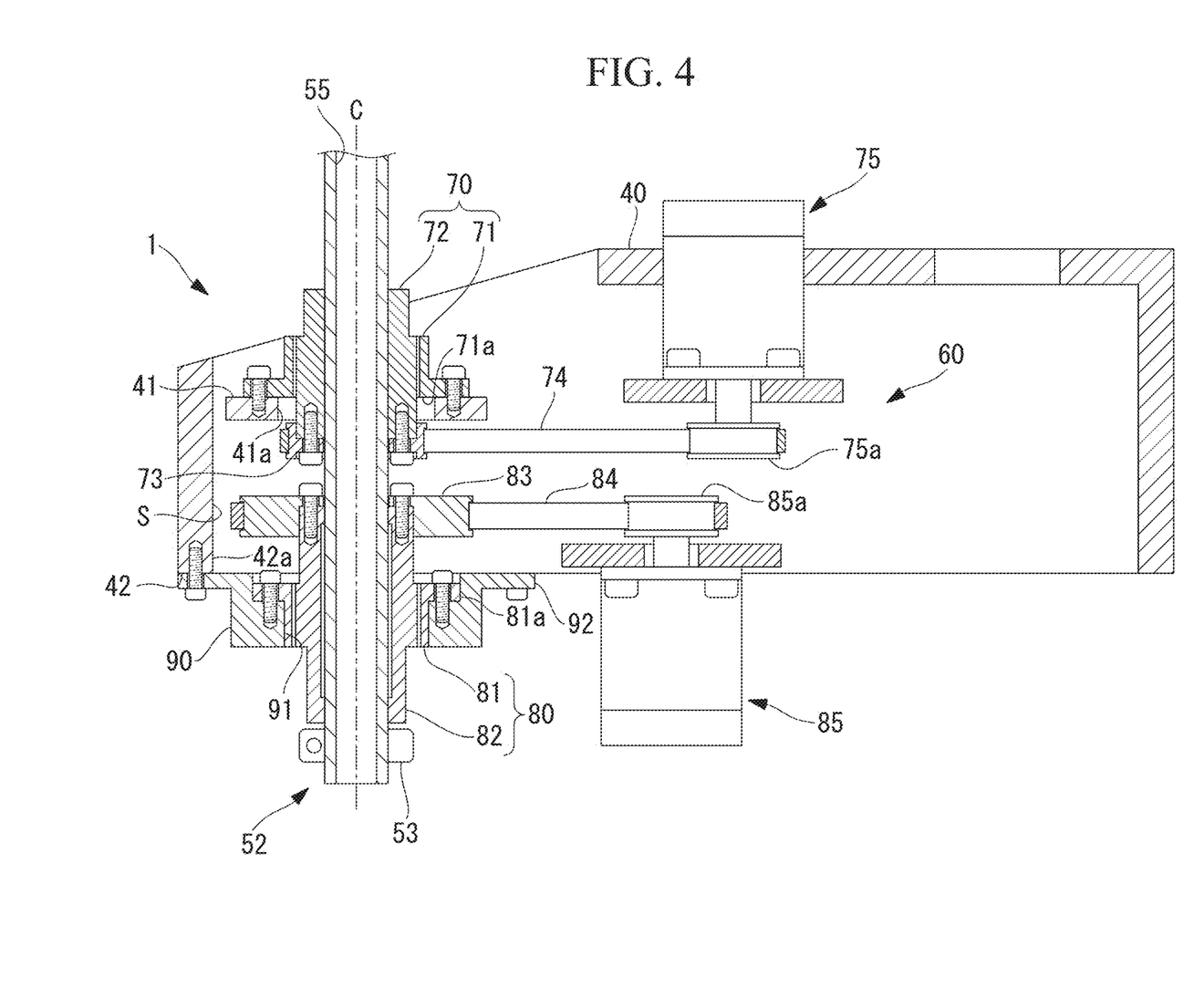
FIG. 4 is a partial vertical cross-section showing a first modification of the linear motion mechanism of the SCARA robot in FIG. 1.

In this embodiment, both of the servo motors 75 and 85 are attached from the lower surface 42 side of the second arm 40. Alternatively, as shown in FIG. 4, the servo motor 75 may be attached from the upper surface 41 side of the second arm 40, and the servo motor 85 may be attached from the lower surface 42 side of the second arm 40.

In that case, because the servo motors 75 and 85 are arranged so as to face each other in the vertical direction, the servo motor 75 and the servo motor 85 are not arranged adjacent to each other in the radial direction. Accordingly, a wider space can be provided around each of the servo motors 75 and 85 in the radial direction, increasing the degree of freedom of arrangement of each of the servo motors 75 and 85, and improving ease of work at the time of assembly, maintenance, and the like.

Furthermore, because the servo motor 75 and the servo motor 85 can be disposed closer to the ball screw nut 70 and the ball spline nut 80, respectively, it is also possible to suppress an increase in size of the second arm 40.

Figure 5:
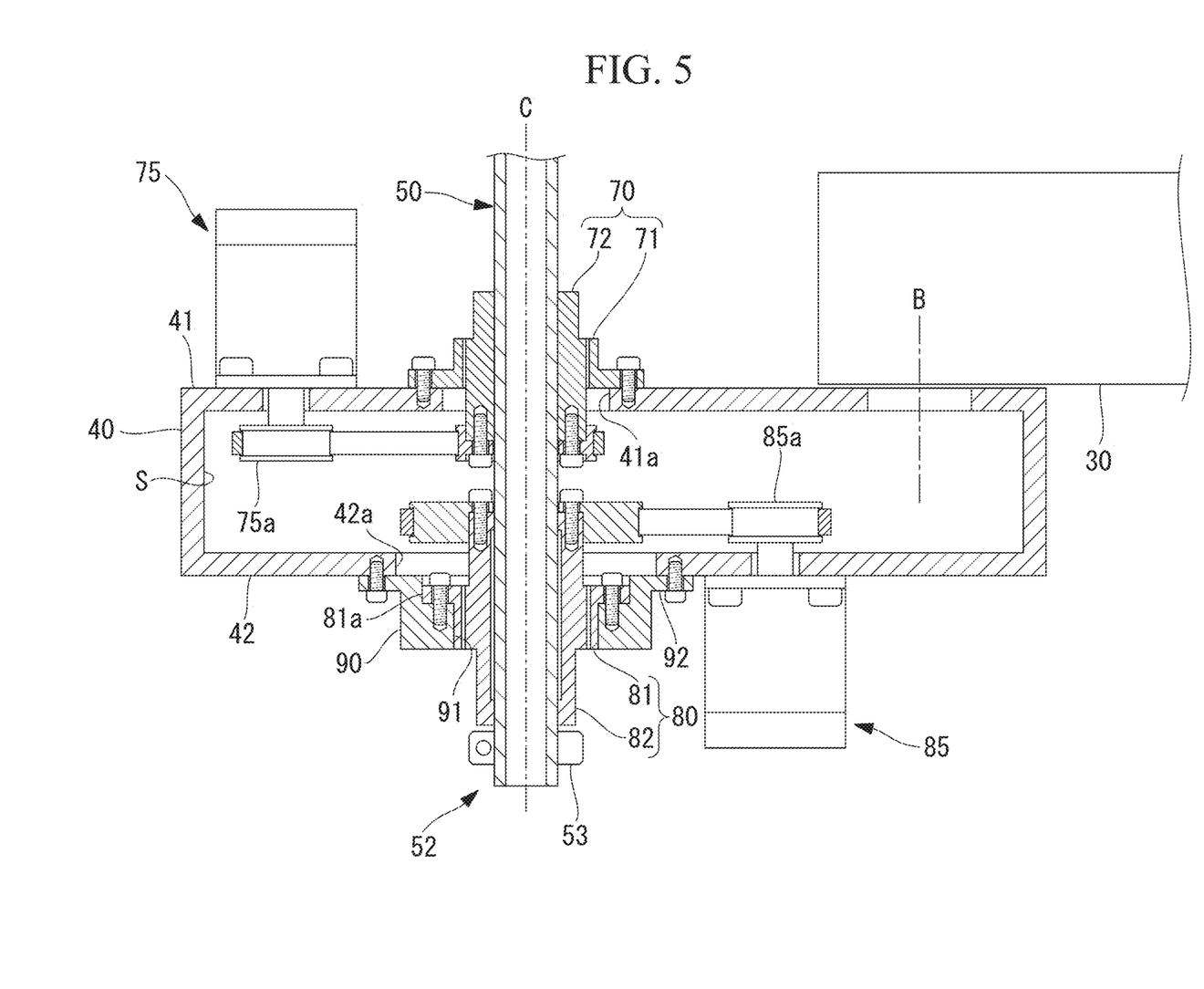
FIG. 5 is a partial vertical cross-section showing a second modification of the linear motion mechanism of the SCARA robot in FIG. 1.

In this embodiment, the servo motors 75 and 85 are both disposed at positions closer to the proximal end than the shaft 50 of the second arm 40 is. Instead of this, as shown in FIG. 5, the servo motor 75 may be disposed on the upper surface 41 of the second arm 40, at a position closer to the distal end than the shaft 50 is.

In that case, the length in the radial direction between the servomotor 75 and the J2 axis B is greater than the length in the radial direction between the shaft 50 and the J2 axis B. This means that, even if the second arm 40 is rotated about the J2 axis B until the shaft 50 comes into contact with the first arm 30, the servo motor 75 does not come into contact with the first arm 30. Accordingly, even when the servo motor 75 is disposed on the upper surface 41 of the second arm 40, that is, on the first arm 30 side, there is no need to limit the movable range of the second arm 40 about the J2 axis B to avoid interference between the servo motor 75 and the first arm 30.

Figure 6:
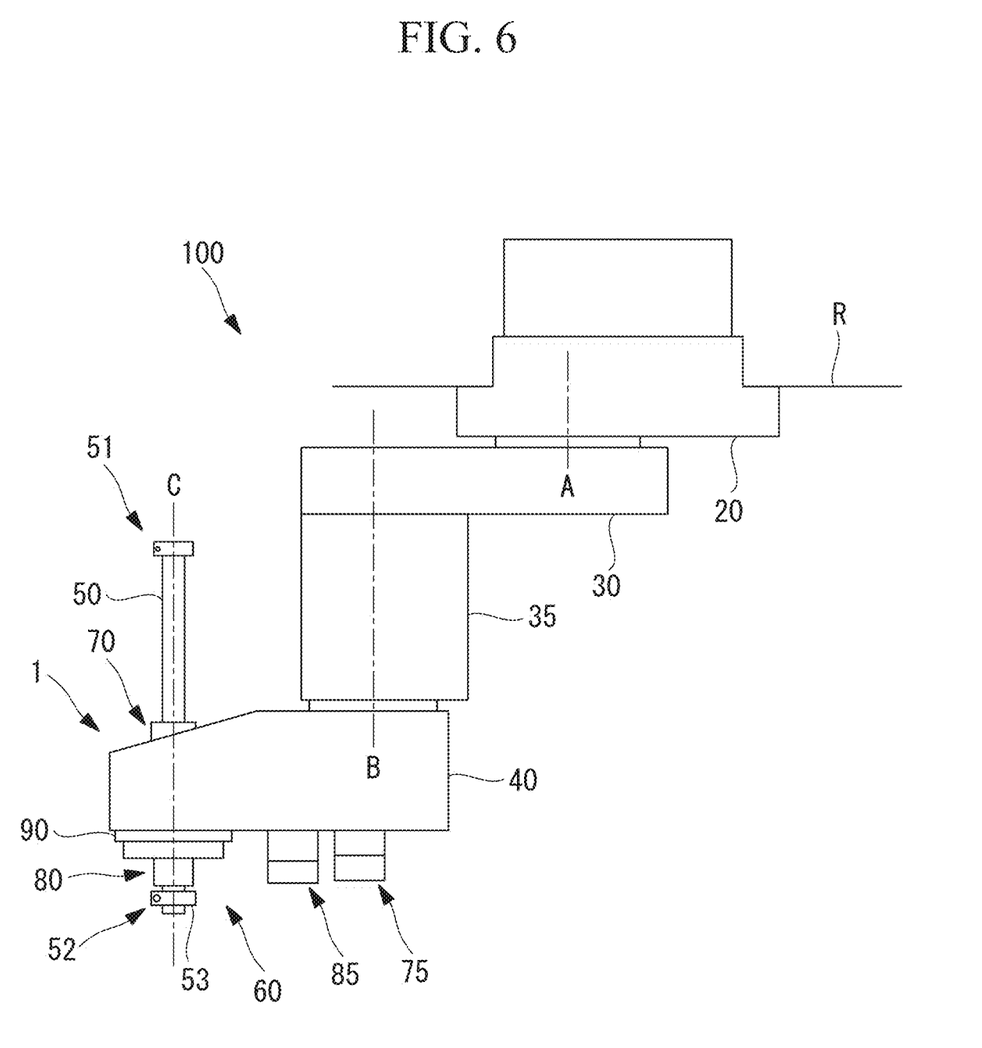
FIG. 6 is a side view showing a first modification of the SCARA robot in FIG. 1.

In this embodiment, as shown in FIG. 6, the SCARA robot 100 may include, between the first arm 30 and the second arm 40, a connecting portion 35 that connects the first arm 30 and the second arm 40 to each other so as to be relatively rotatable about the J2 axis B.

In the embodiment shown in FIG. 6, the dimension of the connecting portion 35 in the direction of the J2 axis B is set to be larger than the amount of protrusion of the shaft 50 protruding upward from the second arm 40 at the upper limit of the stroke of the shaft 50. This means that, even if the second arm 40 rotates about the J2 axis B with the shaft 50 protruding most toward the first arm 30, the shaft 50 does not interfere with the first arm 30.

Thus, the second arm 40 can be rotated by 360° or more about the J2 axis B with respect to the first arm 30.

Furthermore, for example, when the servomotor 75 is attached to the upper surface 41 side of the second arm 40 and the height of the servomotor 75 is larger than the amount of upward protrusion of the shaft 50, the dimension of the connecting portion 35 in the J2 axis B direction may be set to be larger than the height of the servomotor 75. This allows the second arm 40 to be able to rotate about the J2 axis B by 360° or more, as in the above case.

Figure 7:
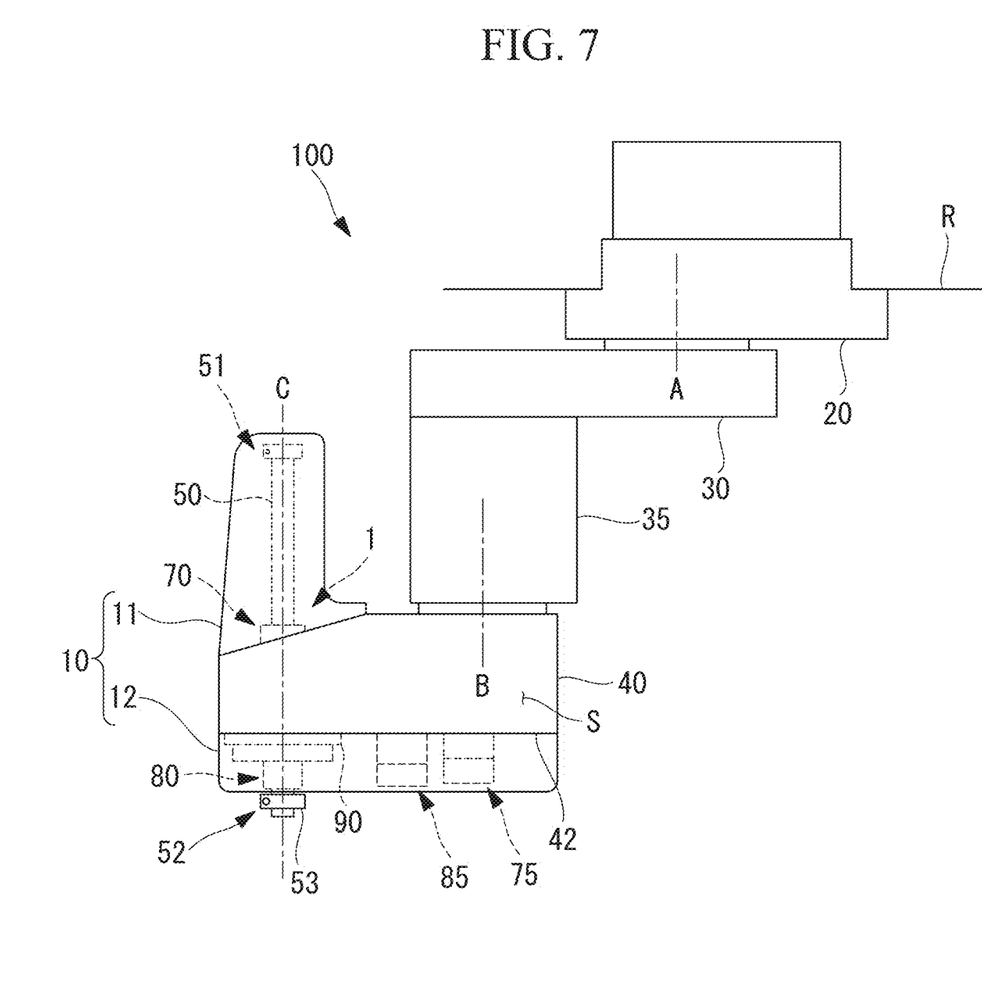
FIG. 7 is a side view showing a second modification of the SCARA robot in FIG. 1.

In addition, in this embodiment, as shown in FIG. 7, a cover member 10 that is detachably attached to the second arm 40 and surrounds, in a liquid-tight state, the linear motion mechanism 1 exposed to the outside from the cavity S of the second arm 40 may be provided.

For example, the cover member 10 includes a first cover portion 11 that surrounds a part of the shaft 50 and the ball screw nut 70 protruding upward from the second arm 40. Similarly, the cover member 10 includes a second cover portion 12 that surrounds a part of the shaft 50 and the ball spline nut 80 protruding downward from the second arm 40, and the servomotors 75 and 85. A through-hole through which the shaft 50 passes is provided in the lower surface of the second cover portion 12.

With this structure, the linear motion mechanism 1 exposed to the outside of the second arm 40 is protected from external dust and moisture by the first cover portion 11 and the second cover portion 12. Thus, the frequency of maintenance of the linear motion mechanism 1 can be reduced.

In the embodiment shown in FIG. 7, the first cover portion 11 surrounds the ball screw nut 70, and the second cover portion 12 surrounds the ball spline nut 80. Therefore, when only one of the ball screw nut 70 and the ball spline nut 80 is maintained, only one of the first cover portion 11 and the second cover portion 12 surrounding the nut to be maintained is removed from the second arm 40.

In this embodiment, the ball screw nut 70 and the ball spline nut 80 are attached to the upper surface 41 side and the lower surface 42 side of the second arm 40, respectively. Instead of this, the ball screw nut 70 may be attached to the lower surface 42 side of the second arm 40, and the ball spline nut 80 may be attached to the upper surface 41 side of the second arm 40.

In this embodiment, the SCARA robot 100 has been described by way of example as a ceiling-suspended robot suspended from the ceiling R. However, the SCARA robot may be installed on a floor surface or a wall surface.

The invention claimed is:

1. A linear motion mechanism comprising:
a shaft extending along a predetermined axis;
a structural member provided with a cavity through which the shaft extends;
a spline nut and a ball screw nut that are detachably attached to the structural member from both sides sandwiching the structural member via attachment flanges provided thereon and that support the shaft so as to be rotatable about the predetermined axis and so as to be movable in a direction of the predetermined axis, respectively, with respect to the structural member;
a power transmission member fixed to, inside the cavity, at least one of the spline nut and the ball screw nut, the power transmission member having an outer diameter larger than an outer diameter of each of the attachment flanges provided on at least one of the spline nut and the ball screw nut to which the power transmission member is fixed; and
an adapter detachably attached to the structural member and having a larger outer diameter than the power transmission member,
wherein the structural member includes an opening configured to be opened by removing the adapter from the structural member, and
the at least one of the spline nut and the ball screw nut is attached to the structural member via the adapter so that the power transmission member is taken out of the cavity through the opening when the adapter is removed from the structural member.

2. The linear motion mechanism according to claim 1, further comprising a cover member detachably attached to the structural member and surrounding at least one of the spline nut and the ball screw nut.

3. The linear motion mechanism according to claim 2, wherein the cover member includes a first cover portion surrounding the spline nut and a second cover portion surrounding the ball screw nut.

4. A SCARA robot comprising the linear motion mechanism according to claim 1, wherein
the structural member is a second arm supported so as to be rotatable about a first axis extending in a vertical direction with respect to a first arm supported so as to be rotatable in a horizontal direction,
the shaft penetrates through a distal end portion of the second arm along a second axis serving as the predetermined axis and parallel to the first axis, and
one of the spline nut and the ball screw nut is detachably attached to a first surface, which is located on the first arm side, of the second arm, and the other is detachably attached to a second surface of the second arm, the second surface being located on an opposite side of the first surface by sandwiching the cavity.

5. The SCARA robot according to claim 4, further comprising:
a spline nut motor that supplies a rotational force to the spline nut; and
a ball screw nut motor that supplies a rotational force to the ball screw nut, wherein
the spline nut motor is disposed on the same side as the first surface or the second surface of the second arm to which the spline nut is attached, and
the ball screw nut motor is disposed on the same side as the first surface or the second surface of the second arm to which the ball screw nut is attached.

6. The SCARA robot according to claim 5, wherein one of the spline nut motor and the ball screw nut motor is disposed on the first surface, at a position closer to a distal end of the SCARA robot than the shaft is.

7. The SCARA robot according to claim 4, further comprising:
a spline nut motor that supplies a rotational force to the spline nut; and
a ball screw nut motor that supplies a rotational force to the ball screw nut,
wherein the spline nut motor and the ball screw nut motor are attached to the second surface side of the second arm.

8. The SCARA robot according to claim 4, further comprising a columnar connecting portion connecting the first arm and the second arm so as to be rotatable about the first axis,
wherein the connecting portion is larger in a direction of the first axis than a member disposed on the first surface side of the second arm.

* * * * *